(12) United States Patent
Kim et al.

(10) Patent No.: US 12,738,487 B2
(45) Date of Patent: Sep. 15, 2026

(54) OLIVINE-BASED CATHODE MATERIALS WITH IMPROVED CONDUCTIVITY

(71) Applicant: Rivian IP Holdings, LLC, Irvine, CA (US)

(72) Inventors: Soo Kim, Fremont, CA (US); Majid Talebiesfandarani, Emeryville, CA (US); Sookyung Jeong, San Jose, CA (US); Rubayyat Mahbub, Fremont, CA (US); Muratahan Aykol, San Jose, CA (US); Tae Kyoung Kim, Albany, CA (US); Ki Tae Park, Santa Clara, CA (US)

(73) Assignee: Rivian IP Holdings, LLC, Irvine, CA (US)

( * ) Notice: Subject to any disclaimer, the term of this patent is extended or adjusted under 35 U.S.C. 154(b) by 552 days.

(21) Appl. No.: 17/824,310

(22) Filed: May 25, 2022

(65) Prior Publication Data

US 2023/0387404 A1 Nov. 30, 2023

(51) Int. Cl.

| | |
|---|---|
| ***H01M 4/525*** | (2010.01) |
| ***C01B 25/45*** | (2006.01) |
| ***H01M 4/36*** | (2006.01) |
| ***H01M 4/505*** | (2010.01) |
| ***H01M 4/587*** | (2010.01) |

(52) U.S. Cl.

CPC ............. *H01M 4/525* (2013.01); *C01B 25/45* (2013.01); *H01M 4/366* (2013.01); *H01M 4/505* (2013.01); *H01M 4/587* (2013.01)

(58) Field of Classification Search

CPC ...... H01M 4/525; H01M 4/366; H01M 4/505; H01M 4/587; H01M 4/136; H01M 4/5825; H01M 4/625; H01M 4/364; H01M 4/626; H01M 10/0525; H01M 2004/027;

(Continued)

(56) References Cited

U.S. PATENT DOCUMENTS

2011/0052988 A1 3/2011 Beck et al.
2012/0021288 A1* 1/2012 Song ..................... C04B 35/447 252/182.1

(Continued)

FOREIGN PATENT DOCUMENTS

CN 103165883 A 6/2013
JP 2014-524133 A 9/2014

(Continued)

OTHER PUBLICATIONS

Office Action on KR Appl. No. 10-2023-0063465 dated May 19, 2025, with machine translation.

(Continued)

*Primary Examiner* — Daniel S Gatewood
(74) *Attorney, Agent, or Firm* — Foley & Lardner LLP

(57) ABSTRACT

An electrode active material includes a dopant ($M^2$) and a lithium manganese iron phosphate host material represented as $LiM^2_xMn_yFe_{1-x-y}PO_4$, wherein the dopant is a transition metal or main group metal, and the electrode active material exhibits an increased ionic conductivity compared to a lithium manganese iron phosphate ($LiMn_yFe_{1-y}PO_4$) without the dopant, wherein x is 0.01 to 0.15, and y is 0.30 to 0.85.

18 Claims, 8 Drawing Sheets

(58) Field of Classification Search
CPC .......... H01M 10/052; H01M 2004/028; C01B 25/45; Y02E 60/10
See application file for complete search history.

(56) References Cited

U.S. PATENT DOCUMENTS

| | | | | |
|---|---|---|---|---|
| 2012/0214071 | A1* | 8/2012 | Chiang | H01M 4/382 429/231.95 |
| 2014/0138591 | A1* | 5/2014 | Yoon | H01M 4/525 429/221 |
| 2015/0311527 | A1* | 10/2015 | Khot | H01M 10/0525 429/188 |
| 2015/0372303 | A1 | 12/2015 | Kao et al. | |

FOREIGN PATENT DOCUMENTS

| | | | | |
|---|---|---|---|---|
| KR | 1020130131103 | A | 12/2013 | |
| KR | 1020160025016 | | 3/2016 | |
| KR | 1020190053111 | A | 5/2019 | |
| WO | WO-2008018633 | A1 * | 2/2008 | C01B 25/45 |
| WO | WO-2019171994 | A1 * | 9/2019 | |

OTHER PUBLICATIONS

Office Action on DE Appl. No. DE102023113326.8 dated Apr. 2, 2026, with machine translation.

* cited by examiner

OLIVINE-BASED CATHODE MATERIALS WITH IMPROVED CONDUCTIVITY

INTRODUCTION

The present technology is generally related to lithium rechargeable batteries. More particularly the technology relates to coatings for lithium iron phosphates and lithium manganese iron phosphate electrode active materials.

SUMMARY

In one aspect, an electrode active material includes a dopant ($M^2$) and a lithium manganese iron phosphate host material represented as $LiM^2_xMn_yFe_{1-x-y}PO_4$, wherein the dopant is a transition metal or main group metal, and the electrode active material exhibits an increased ionic conductivity compared to a lithium manganese iron phosphate ($LiMn_yFe_{1-y}PO_4$) without the dopant, wherein x is 0.01 to 0.15, and y is 0.30 to 0.85. In the formula, $M^2$ may be Al, Bi, Ca, Ce, Co, Cr, Ga, Hf, In, La, Mg, Mo, Nb, Ni, Sc, Sn, Ti, V, W, Y, Zn, Zr, or a mixture of any two or more thereof.

In another aspect, cathode active material includes a host phase of formula $LiM^2_xMn_yFe_{1-x-y}PO_4$ and a secondary phase of formula $Li_aM^2_bP_cO_d$, where x is 0.01 to 0.15, y is 0.30 to 0.85, a is 0 to 11, b is 1 to 4, c is 0 to 12, and d is 4 to 29, wherein $M^2$ is Al, Bi, Ca, Ce, Co, Cr, Ga, Hf, In, La, Mg, Mo, Nb, Ni, Sc, Sn, Ti, V, W, Y, Zn, Zr, or a mixture of any two or more thereof, $Li_aM^2_bP_cO_d$ is present in the host phase at less than about 15 wt %, and the cathode active material exhibits an increased ionic conductivity compared to $LiMn_yFe_{1-y}PO_4$ without the $M^2$ and the secondary $Li_aM^2_bP_cO_d$ phase.

In another aspect, a process is provided for preparing a doped lithium manganese iron phosphate ($LiM^2_xMn_yFe_{1-x-y}PO_4$) compound including a dopant ($M^2$) that is a transition metal or main group metal, where the process includes forming a solution comprising a lithium source, a manganese source, an iron source, dopant source, and a phosphorus source in a solvent, mixing the solution at a predetermine pH and for a period of time to form a precipitate of a lithium-metal-phosphorus-oxygen intermediate precursor, collecting the precipitate, annealing the precipitate at an elevated temperature to form the doped $LiM^2_xMn_yFe_{1-x-y}PO_4$, wherein x is 0.01 to 0.15, and y is 0.30 to 0.85.

In another aspect, an electrochemical cell may include an anode and a cathode that includes any of the electrode active materials described herein as including a doped lithium manganese iron phosphate, where the anode and/or cathode may also include a conductive carbon, a binder, a current collector, or any two or more thereof.

In another aspect, a process is provided for recharging a lithium ion battery that includes any of the doped lithium manganese iron phosphate materials described herein includes applying a charging voltage to the lithium ion battery, wherein a time required to charge the lithium ion battery is less than a lithium ion battery comprising an undoped lithium manganese iron phosphate ($LiMn_yFe_{1-y}PO_4$; $0.01 \leq x \leq 0.15$, and $0.3 \leq y \leq 0.85$) host material.

In other aspects, a battery cell may be incorporated into a battery pack comprising a plurality of the battery cells. Such batteries, battery cells, or battery packs may then be incorporated in a hybrid electric vehicle or electric vehicle as a power source.

DETAILED DESCRIPTION

Figure 1:
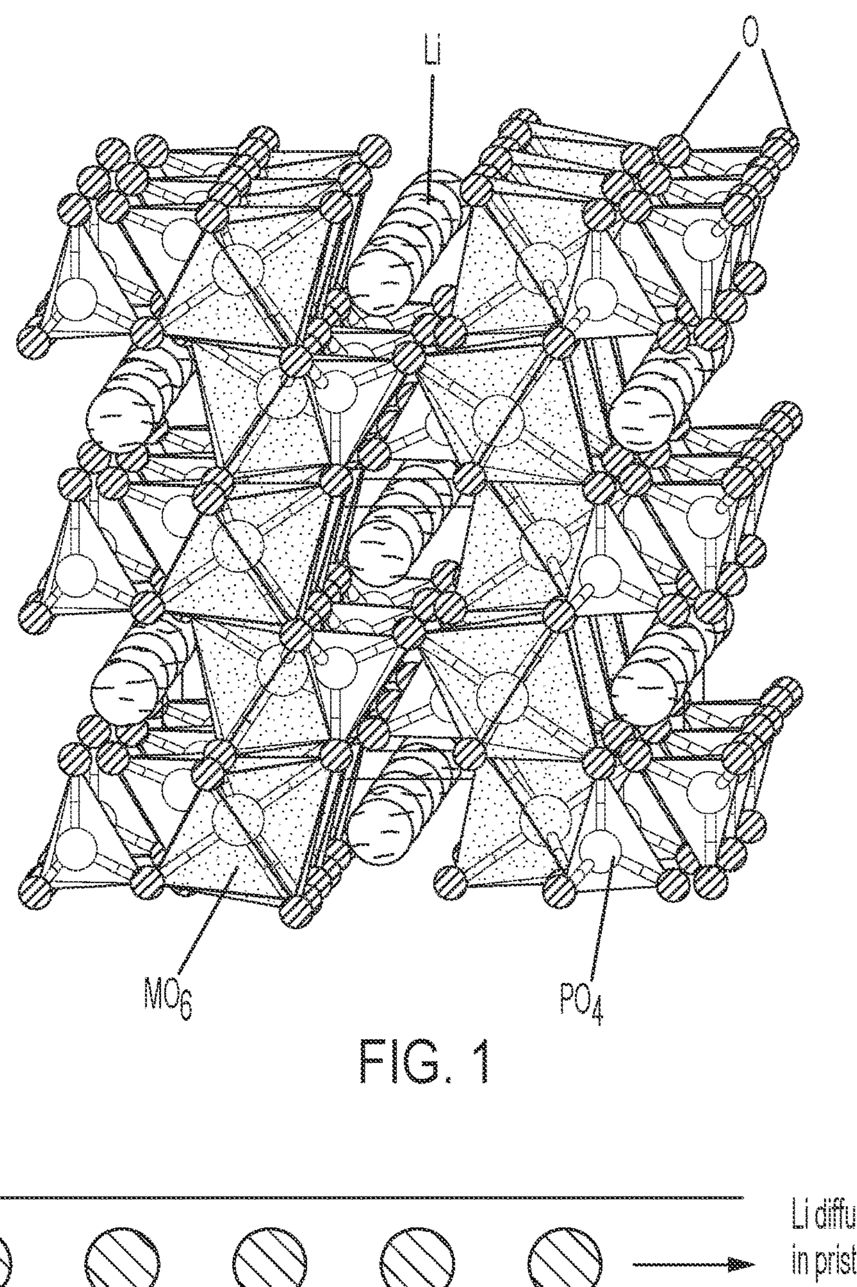
FIG. 1 is a schematic illustration of an Olivine-type $LiMPO_4$ (M=Fe, Mn, etc.) cathode material, according to the examples.

Various embodiments are described hereinafter. It should be noted that the specific embodiments are not intended as an exhaustive description or as a limitation to the broader aspects discussed herein. One aspect described in conjunction with a particular embodiment is not necessarily limited to that embodiment and can be practiced with any other embodiment(s).

As used herein, "about" will be understood by persons of ordinary skill in the art and will vary to some extent depending upon the context in which it is used. If there are uses of the term which are not clear to persons of ordinary skill in the art, given the context in which it is used, "about" will mean up to plus or minus 10% of the particular term.

The use of the terms "a" and "an" and "the" and similar referents in the context of describing the elements (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the embodiments and does not pose a limitation on the scope of the claims unless otherwise stated. No language in the specification should be construed as indicating any non-claimed element as essential.

$LiMO_2$ (M=Ni, Mn, and/or Co; i.e. "LiNMC" materials) cathode active materials are routinely used in current electric vehicle production due their high energy densities (i.e., high voltage, high capacity). Because passenger electric vehicles and/or mobile electronic devices (i.e. phones, laptops, tablets, and the like) have a very limited space for the placement of rechargeable battery packs, using cathode materials with higher high energy density is of high consideration when designing such devices. As the Ni content increases in LiNMC cathodes, the battery thermal stability is also affected, leading to various safety issues and concerns.

$LiFePO_4$ (LFP) is a class of cathode materials, related to LiNMC, but is entirely based upon the oxidation and reduction of the iron. It also provides better safety profiles when compared to LiNMC materials. However, the energy density of LFP is significantly lower than LiNMC-based cathodes.

The average cell voltage of LFP is about 3.2 V vs. graphite, while the average voltage of $LiMO_2$ (lithium metal oxide) cathode materials varies from about 3.4 to 4.0 V vs. graphite, depending on the metal. In addition, the practical capacity of LFP materials is from about 150 mAh/g to about 165 mAh/g, compared to LiNMC material that exhibit capacities of about 170 mAh/g to about 210 mAh/g. As used herein, the energy density is defined as the product of voltage and capacity; therefore, the energy density of LFP is expected to be lower than LiNMC materials.

Manganese (Mn)-based olivine-type cathode structures, i.e., $LiMnPO_4$ (LMP), exhibit a redox voltage of about 4.0 V vs. graphite, which is much higher than that for LFP. However, LMP has a practical discharge capacity of about 145 mAh/g, which is slightly lower than LFP. The $Li^+$ diffusivity (i.e., ionic conductivity) of LMP is order of magnitudes lower than LFP, affecting the rate capabilities to be slower than LFP chemistry (i.e., fast charging/discharging). Increasing electronic conductivity (i.e., facilitating $e^-$ transport) has been shown to have a positive impact with regard to the ionic conductivity of a material one of main modifications to the materials includes increasing the wt % of carbon coatings on LMF surfaces.

Generally, the cathode active material $LiMPO_4$ (M=Fe, Mn, etc.) exhibits the olivine structure that includes $MO_6$ octahedra, with Li and O atoms in the structure. See FIG. 1. During charging and discharging, Li ions enter and exit the $LiMPO_4$ framework in the (010) direction: i.e., as a 1-dimensional $Li^+$ channel. LFP refers to where the $MO_6$ is $FeO_6$; LMP is where the $MO_6$ is $MnO_6$; and the LMFP (lithium manganese iron phosphate) of the present technology is where the $MO_6$ is mixture of $FeO_6$ and $MnO_6$. See FIG. 1. The olivine-type cathode materials have two distinct advantages over LiNMC cathode active materials: first, the raw material cost is lower; and second, the risk of thermal runaway is less (i.e. the stability toward thermal runaway is greater).

Disclosed herein are Olivine-based $LiM_xMn_yFe_{1-x-y}PO_4$ cathode materials with improved ionic and electronic conductivities. It has been found that M-P—O (metal phosphate) precursors that include a dopant, M, that leads to less carbon dioxide ($CO_2$) gas evolution from the cathode active material during heat treatment in a reducing environment (i.e. FIG. 5). The doped, or modified, $LiM_xMn_yFe_{1-x-y}PO_4$ cathode materials increase ionic conductivity for a direct modification in the (010) $Li^+$ ion channel path and for enhancing electronic conductivity for achieving more intact interface between the carbon coating and the surface metal atoms at the host materials. Also disclosed herein are methods of improving the ionic conductivity of LMFP with dopants or surface modification. Increased rate capabilities can be helpful to improve the power performance of the electric vehicles, and provide for fast-charging characteristics. In some embodiments, a new Li-M-P—O compound with higher ionic conductivity than LMFP compounds is formed.

In a first aspect, an electrode active material includes a dopant ($M^2$) and a lithium manganese iron phosphate host material represented as $LiM^2_xMn_yFe_{1-x-y}PO_4$. In the electrode active material, the dopant may be a transition metal or main group metal, and the electrode active material exhibits an increased ionic conductivity compared to a lithium manganese iron phosphate ($LiMn_yFe_{1-y}PO_4$) without the dopant. In the above formulae, x is from 0.01 to 0.15, and y is from 0.30 to 0.85.

The dopant, $M^2$ may be Al, Bi, Ca, Ce, Co, Cr, Ga, Hf, In, La, Mg, Mo, Nb, Ni, Sc, Sn, Ti, V, W, Y, Zn, Zr, or a mixture of any two or more thereof. In some embodiments, $M^2$ is Al, Bi, Co, Cr, Ga, Hf, In, Mo, Nb, Ni, Sc, Ti, V, W, Y, Zr, or a mixture of any two or more thereof. While in other embodiments $M^2$ is $Mg^{2+}$, $Al^{3+}$, $Ca^{2+}$, $Sc^{3+}$, $Ti^{2+}$, $Ti^{3+}$, $V^{2+}$, $V^{3+}$, $V^{4'}$, $Cr^{2+}$, $Cr^{3+}$, $Co^{2+}$, $Co^{3+}$, $Ni^{2+}$, $Ni^{3+}$, $Zn^{2+}$, $Ga^{3+}$, $Y^{3+}$, $Zr^{4+}$, $Nb^{3+}$, $Nb^{4+}$, $Mo^{3+}$, $Mo^{4+}$, $In^{3+}$, $Sn^{4+}$, $La^{3+}$, $Ce^{3+}$, $Hf^{4+}$, $W^{4+}$, $Bi^{3+}$, or a mixture of any two or more thereof. Alternatively, $M^2$ may be $Mg^{2+}$, $Al^{3+}$, $Sc^{3+}$, $Ti^{2+}$, $Ti^{3+}$, $V^{2+}$, $V^{3+}$, $V^{4+}$, $Cr^{2+}$, $Cr^{3+}$, $Co^{2+}$, $Co^{3+}$, $Ni^{2+}$, $Ni^{3+}$, $Ga^{3+}$, $Zr^{4+}$, $Nb^{3+}$, $Nb^{4+}$, $Mo^{3+}$, $Mo^{4+}$, $In^{3+}$, $Sn^{4+}$, $Hf^{4+}$, $W^{4+}$, or a mixture of any two or more thereof. Generally, overall, the $M^2$ is present in the $LiM^2_xMn_yFe_{1-x-y}PO_4$ compound from about 1 mol % to about 15 mol %.

To further protect the electrode active material, and provide additional ionic conductivity capacity, the electrode active material may include a carbon coating. Illustrative carbon coating materials include, but are not limited to, acetylene black, graphite, graphene, carbon nanotubes, or a mixture thereof.

In another aspect, an electrode active material is provided including a host phase of formula $LiM^2_xMn_yFe_{1-x-y}PO_4$ and a secondary phase of formula $Li_aM^2_bP_cO_d$. In these formulae, x is from 0.01 to 0.15, y is from 0.30 to 0.85, a is 0 to 11, b is 1 to 4, c is 0 to 12, and d is 4 to 29. Additionally, $M^2$ may be Al, Bi, Ca, Ce, Co, Cr, Ga, Hf, In, La, Mg, Mo, Nb, Ni, Sc, Sn, Ti, V, W, Y, Zn, Zr, or a mixture of any two or more thereof, and the $M^2$, i.e. the dopant, is present in the host phase at less than about 15 wt %. Interestingly, the cathode active material exhibits an increased ionic conductivity compared to $LiMn_yFe_{1-y}PO_4$ without the $M^2$ and the secondary phase. In some embodiments, $M^2$ is Al, Bi, Co, Cr, Ga, Hf, In, Mo, Nb, Ni, Sc, Ti, V, W, Y, Zr, or a mixture of any two or more thereof. While in other embodiments, $M^2$ is $Mg^{2+}$, $Al^{3+}$, $Ca^{2+}$, $Sc^{3+}$, $Ti^{2+}$, $Ti^{3+}$, $V^{2+}$, $V^{3+}$, $V^{4+}$, $Cr^{2+}$, $Cr^{3+}$, $Co^{2+}$, $Co^{3+}$, $Ni^{2+}$, $Ni^{3+}$, $Zn^{2+}$, $Ga^{3+}$, $Y^{3+}$, $Zr^{4+}$, $Nb^{3+}$, $Nb^{4+}$, $Mo^{3+}$, $Mo^{4+}$, $In^{3+}$, $Sn^{4+}$, $La^{3+}$, $Ce^{3+}$, $Hf^{4'}$, $W^{4+}$, $Bi^{3+}$, or a mixture of any two or more thereof. Alternatively, $M^2$ may be $Mg^{2+}$, $Al^{3+}$, $Sc^{3+}$, $Ti^{2+}$, $Ti^{3+}$, $V^{2+}$, $V^{3+}$, $V^{4+}$, $Cr^{2+}$, $Cr^{3+}$, $Co^{2+}$, $Co^{3+}$, $Ni^{2+}$, $Ni^{3+}$, $Ga^{3+}$, $Zr^{4+}$, $Nb^{3+}$, $Nb^{4+}$, $Mo^{3+}$, $Mo^{4+}$, $In^{3+}$, $Sn^{4+}$, $Hf^{4+}$, or a mixture of any two or more thereof. As above, the electrode active material may include a carbon coating.

The electrode active material may contain a secondary phase. Illustrative secondary phases include, but are not limited to, $Li_3V_2(PO_4)_3$, $LiV_2P_5O_{16}$, $Li_2InFe(P_2O_7)_2$, $Li_4MnV_3(P_2O_7)_4$, $LiVP_2O_7$, $Li_3Cr_2(PO_4)_3$, $LiV(PO_3)_4$, $LiMo_2(PO_4)_3$, $Li_8V_3P_8O_{29}$, $LiP_3(WO_6)_2$, $LiZr_2(PO_4)_3$, $Li_3Mo_3P_3O_{17}$, $LiCrP_2O_7$, $LiVPO_5$, $LiV_2(PO_4)_3$, $LiInP_2O_7$, $Li_{11}V_8(PO_4)_{12}$, $Li_2VCr(P_2O_7)_2$, $Li_9Cr_3P_8O_{29}$, $Li_3MnV(P_2O_7)_2$, $Li_6V_3P_8O_{29}$, $LiCr_4(PO_4)_3$, or $Li_3Mo_2(PO_4)_3$. The secondary phase may be present in the host phase from about 0.01 wt % to about 15 wt %. This may include where the secondary phase is present in the host phase from about 0.01 wt % to about 10 wt %, or from about 0.01 wt % to about 5 wt %.

The electrode active materials tend have a particulate morphology, and in the particles, the secondary phase may be present in the composition at higher concentrations near the surface of the particles compared to the core of the particles. If the interfacial energy between the secondary phase and the host phase is smaller (i.e., easier to form an interface), the secondary phase may be present as nanocomposite with the host cathode materials as a precipitate form, rather than segregating toward the surface region of the particles.

Also provided for herein are processes for preparing the doped lithium manganese iron phosphates ($LiM^2_x Mn_yFe_{1-x-y}PO_4$), where in such a formula $M^2$ represents the dopant that is a transition metal or main group element. The process includes forming a solution that includes a lithium source, a manganese source, an iron source, dopant source, and a phosphorus source, in a solvent. The source components and solvent can be distinct compounds, or alternatively they may be a single compound that functions as a source of multiple components (e.g., acidic solvent such as $H_3PO_4$ can serve as a phosphorus source). The solution is then mixed at a predetermined pH and for a period of time sufficient to form a precipitate of a lithium-metal-phosphorus-oxygen composition that is a precursor the lithium manganese iron phosphate. The precipitate is collected and then subjected to an annealing process where the lithium-metal-phosphorus-oxygen composition is heated to convert it to the lithium manganese iron phosphate.

In such a process, illustrative lithium source materials include, but are not limited to, $Li_2CO_3$, $Li_3PO_4$, $LiOH·H_2O$, $LiHCO_3$, or mixture thereof. The manganese and iron sources may be any of the metals, metal oxides, or salts of the metals. These may include, but are not limited to $Mn^0$, $Fe^0$, $M^1_qO_{q'}$, $M^1_q(NO_3)_{q'}$, $M^1_qCl_{q'}$, $M^1_q(PO_4)_{q'}$, $M^1_q(SO_4)_{q'}$, or a mixture of any two or more thereof, where $M^1$ is Mn or Fe, and q and q' are individually 1, 2, 3, 4, 5, 6, or 7.

The dopant source may also be the dopant metal as a dopant metal oxide, or as a dopant metal salt. Illustrative dopant sources include, but are not limited to, $M^2$ metal, $M^2_qO_{q'}$, $M^2_q(NO_3)_{q'}$, $M^2_qCl_{q'}$, $M^2_q(PO_4)_{q'}$, $M^2_q(SO_4)_{q'}$, or a mixture of any two or more thereof, wherein $M^2$ is Al, Bi, Ca, Ce, Co, Cr, Ga, Hf, In, La, Mg, Mo, Nb, Ni, Sc, Sn, Ti, V, W, Y, Zn, Zr, or a mixture of any two or more thereof, and q and q' are individually 1, 2, 3, 4, 5, 6, or 7.

In the process, the mixing is conducted at a neutral to acidic pH (i.e. from about 1 to 7). The mixing is also conducted for a time sufficient to nucleate and form a precipitate. The time may range in various embodiments from about 1 minute to 48 hours. In some embodiments, it is from about 1 minute to 24 hours, from about 1 minute to 12 hours, from about 1 minute to 6 hours, or from about 1 minute to about 1 hour. Also noted is the temperature at which the mixing is conducted. Again, the temperature is sufficient to form the precipitate efficiently. The elevated temperature may be from about 50° C. to about 100° C.

In the process, the collecting of the precipitate may include collecting it by filtration, followed by washing with a solvent. Illustrative solvents include, but are not limited to, water, alcohols, ketones, and the like.

The annealing may be conducted in air. In some embodiments, the annealing is conducted in the presence of a gas that may include $N_2$, $H_2$, CO, $CO_2$, or a mixture of any two or more thereof.

In another aspect, an electrochemical cell may include an anode and a cathode that includes any of the electrode active materials described herein as including a doped lithium manganese iron phosphate. In such embodiments, the anode and/or cathode may also include a conductive carbon (in addition to any carbon coatings that may be included), a binder, a current collector, or any two or more thereof.

Illustrative conductive carbon species include graphite, carbon black, Super P carbon black material, Ketjen Black, Acetylene Black, SWCNT, MWCNT, graphite, carbon nanofiber, and/or graphene, graphite. Illustrative binders may include, but are not limited to, polymeric materials such as polyvinylidenefluoride ("PVDF"), polyvinylpyrrolidone ("PVP"), styrene-butadiene or styrene-butadiene rubber ("SBR"), polytetrafluoroethylene ("PTFE") or carboxymethylcellulose ("CMC"). Other illustrative binder materials can include one or more of: agar-agar, alginate, amylose, Arabic gum, carrageenan, caseine, chitosan, cyclodextrines (carbonyl-beta), ethylene propylene diene monomer (EPDM) rubber, gelatine, gellan gum, guar gum, karaya gum, cellulose (natural), pectine, poly(3,4-ethylenedioxythiophene) polystyrene sulfonate (PEDOT-PSS), polyacrilic acid (PAA), poly(methyl acrylate) (PMA), poly(vinyl alcohol) (PVA), poly(vinyl acetate) (PVAc), polyacrylonitrile (PAN), polyisoprene (PIpr), polyaniline (PANi), polyethylene (PE), polyimide (PI), polystyrene (PS), polyurethane (PU), polyvinyl butyral (PVB), polyvinyl pyrrolidone (PVP), starch, styrene butadiene rubber (SBR), tara gum, tragacanth gum, fluorine acrylate (TRD202A), xanthan gum, or mixtures of any two or more thereof. The current collector may include a metal that is aluminum, copper, nickel, titanium, stainless steel, or carbonaceous materials. In some embodiments, the metal of the current collector is in the form of a metal foil. In some specific embodiments, the current collector is an aluminum (Al) or copper (Cu) foil. In some embodiments, the current collector is a metal alloy, made of Al, Cu, Ni, Fe, Ti, or combination thereof. In another embodiment, the metal foils maybe coated with carbon: e.g., carbon-coated Al foil, and the like.

The anodes of the electrochemical cells may include lithium. In some embodiments, the anodes may also include a current collector, a conductive carbon, a binder, and other additives, as described above with regard to the cathode current collectors, conductive carbon, binders, and other additives. In some embodiments, the electrode may comprise a current collector (e.g., Cu foil) with an in situ-formed anode (e.g., Li metal) on a surface of the current collector facing the separator or solid-state electrolyte such that in an uncharged state, the assembled cell does not comprise an anode active material.

The electrochemical cells may also include an electrolyte. The electrolyte may be solution-based electrolyte that includes, typically, a lithium salt and carbonate, ionic liquid, or ether solvent.

The electrochemical cells described herein may be a lithium ion battery.

In another aspect, a process is provided for recharging a lithium ion battery that includes any of the doped lithium manganese iron phosphate materials described herein. The process of recharging may include applying a charging voltage to the lithium ion battery, wherein a time required to charge the lithium ion battery is less than a lithium ion battery including an undoped lithium manganese iron phosphate ($LiMn_yFe_{1-y}PO_4$; $0.01 \le x \le 0.15$, and $0.3 \le y \le 0.85$) host material.

In another aspect, the present disclosure provides a battery pack comprising the cathode active material, the electrochemical cell, or the lithium ion battery of any one of the above embodiments. The battery pack may find a wide variety of applications including but are not limited to general energy storage or in vehicles. In another aspect, a plurality of battery cells as described above may be used to form a battery and/or a battery pack, which may find a wide variety of applications such as general storage, or in vehicles.

Figure 7:
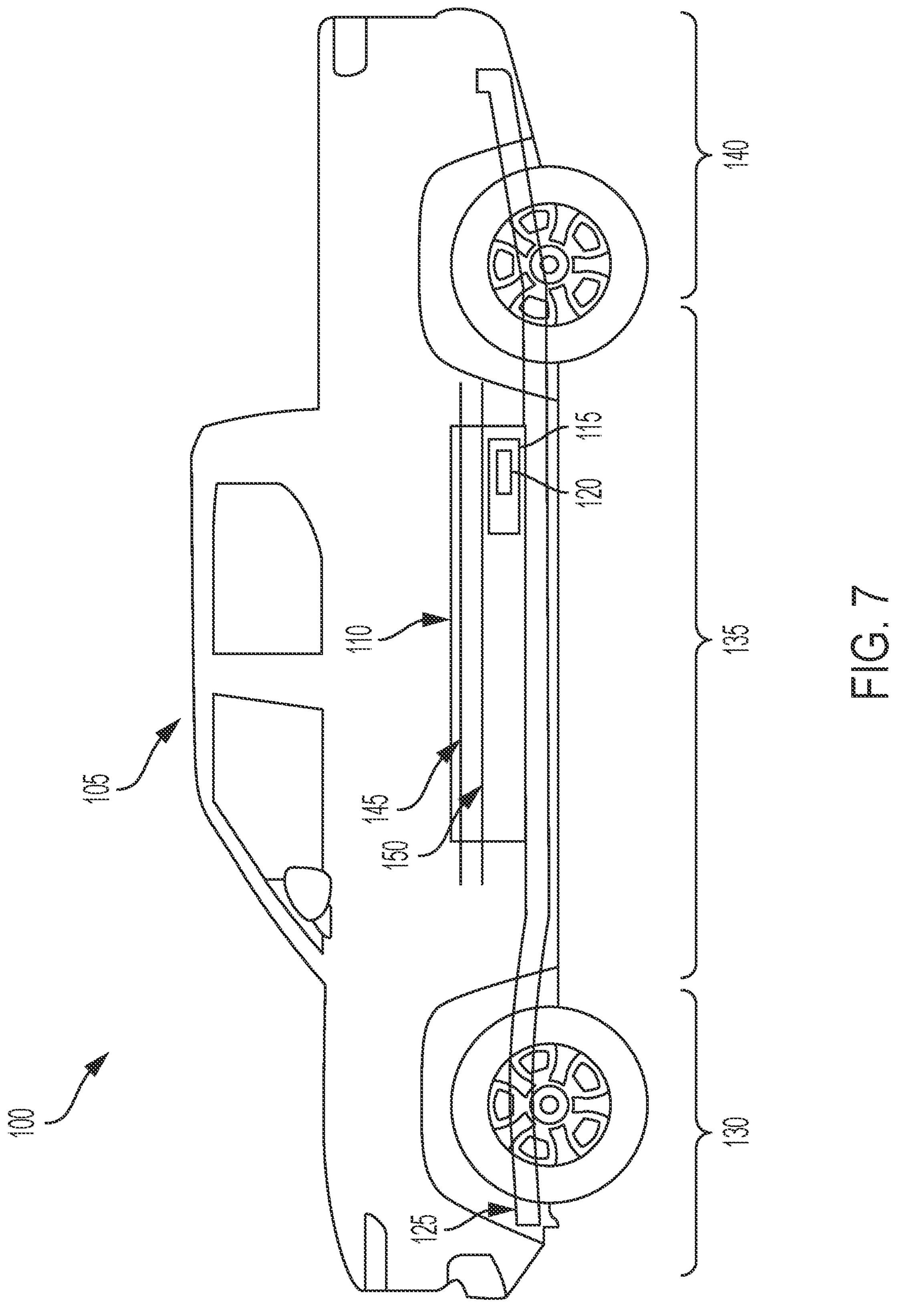
FIG. 7 is an illustration of a cross-sectional view of an electric vehicle, according to various embodiments.

By way of illustration of the use of such batteries or battery packs in an electric vehicle, FIG. 7 depicts an illustrative cross-sectional view 100 of an electric vehicle 105 installed with at least one battery pack 110. Electric vehicle 105 may include an electric truck, electric sport utility vehicle (SUV), electric delivery van, electric automobile, electric car, electric motorcycle, electric scooter, electric passenger vehicle, electric passenger truck, electric commercial truck, hybrid vehicle, or other vehicle such as a sea or air transport vehicle, airplane, helicopter, submarine, boat, or drone, among other possibilities. The battery pack 110 may also be used as an energy storage system to power a building, such as a residential home, or commercial building. Electric vehicles 105 may be fully electric or partially electric (e.g., plug-in hybrid), and they may be fully autonomous, partially autonomous, or unmanned. Electric vehicles 105 can also be human operated or non-autonomous.

Electric vehicles 105 such as electric trucks or automobiles can include on-board battery packs 110, battery modules 115, or battery cells 120 to power the electric vehicles. The electric vehicle 105 can include a chassis 125 (e.g., a frame, internal frame, or support structure). The chassis 125 can support various components of the electric vehicle 105. The chassis 125 can span a front portion 130 (e.g., a hood or bonnet portion), a body portion 135, and a rear portion 140 (e.g., a trunk, payload, or boot portion) of the electric vehicle 105. The battery pack 110 can be installed or placed within the electric vehicle 105. For example, the battery pack 110 can be installed on the chassis 125 of the electric vehicle 105 within one or more of the front portion 130, the body portion 135, or the rear portion 140. The battery pack 110 can include or connect with at least one busbar, e.g., a current collector element. For example, the first busbar 145 and the second busbar 150 can include electrically conductive material to connect or otherwise electrically couple the battery modules 115 or the battery cells 120 with other electrical components of the electric vehicle 105 to provide electrical power to various systems or components of the electric vehicle 105.

Figure 8:
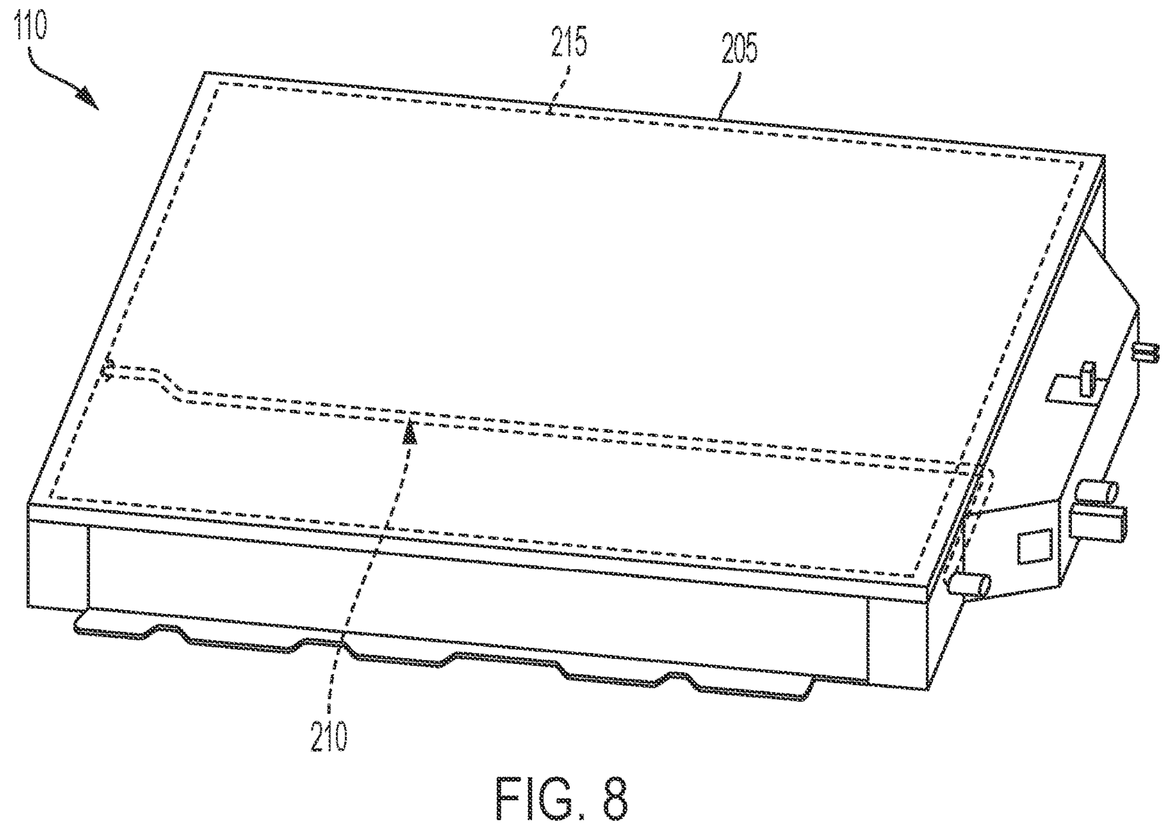
FIG. 8 is a depiction of an illustrative battery pack, according to various embodiments.

FIG. 8 depicts an illustrative battery pack 110. Referring to FIG. 8, among others, the battery pack 110 may provide power to electric vehicle 105. Battery packs 110 may include any arrangement or network of electrical, electronic, mechanical, or electromechanical devices to power a vehicle of any type, such as the electric vehicle 105. The battery pack 110 may include at least one housing 205. The housing 205 may include at least one battery module 115 or at least one battery cell 120, as well as other battery pack components. The housing 205 may include a shield on the bottom or underneath the battery module 115 to protect the battery module 115 from external conditions, for example if the electric vehicle 105 is driven over rough terrain (e.g., off-road, trenches, rocks, etc.) The battery pack 110 may include at least one cooling line 210 that can distribute fluid through the battery pack 110 as part of a thermal/temperature control or heat exchange system that may also include at least one cold plate 215. The cold plate 215 may be positioned in relation to a top submodule and a bottom submodule, such as in between the top and bottom submodules, among other possibilities. The battery pack 110 may include any number of cold plates 215. For example, there may be one or more cold plates 215 per battery pack 110, or per battery module 115. At least one cooling line 210 may be coupled with, part of, or independent from the cold plate 215.

The housing 230 of the battery cell 120 may include one or more materials with various electrical conductivity or thermal conductivity, or a combination thereof. The electrically conductive and thermally conductive material for the housing 230 of the battery cell 120 may include a metallic material, such as aluminum, an aluminum alloy with copper, silicon, tin, magnesium, manganese, or zinc (e.g., aluminum 1000, 4000, or 5000 series), iron, an iron-carbon alloy (e.g., steel), silver, nickel, copper, and a copper alloy, among others. The electrically insulative and thermally conductive material for the housing 230 of the battery cell 120 may include a ceramic material (e.g., silicon nitride, silicon carbide, titanium carbide, zirconium dioxide, beryllium oxide, and among others) and a thermoplastic material (e.g., polyethylene, polypropylene, polystyrene, polyvinyl chloride, or nylon), among others.

Figure 9:
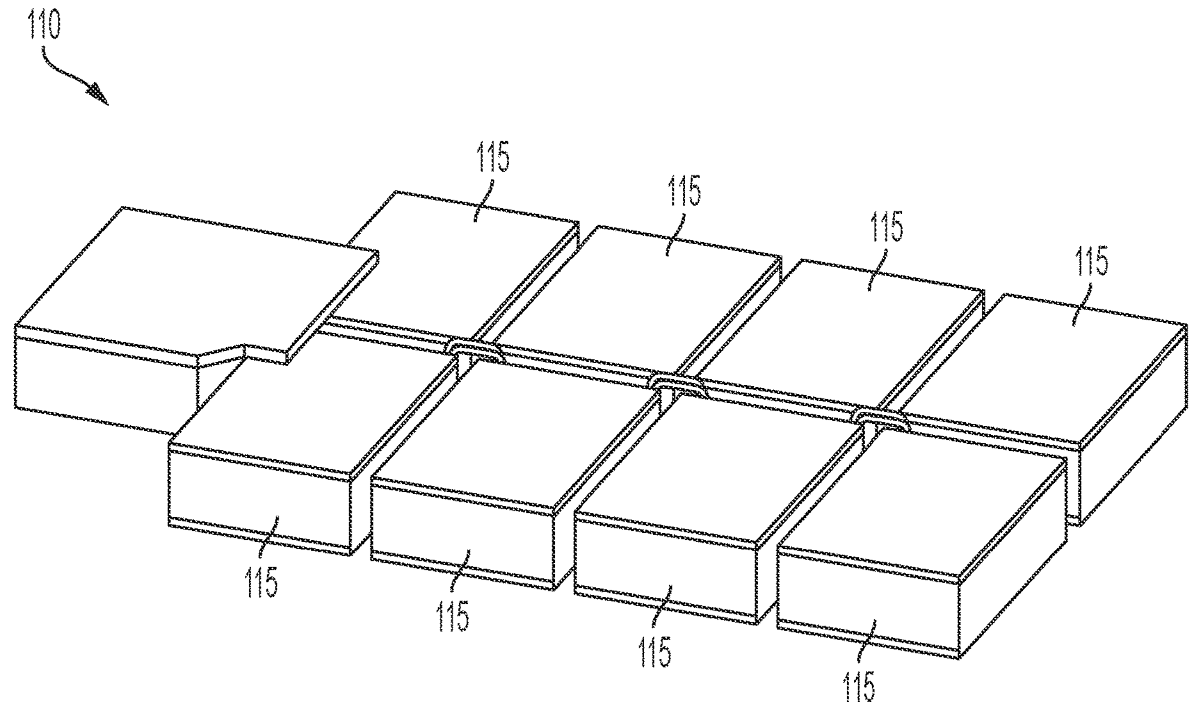
FIG. 9 is a depiction of an illustrative battery module, according to various embodiments.

FIG. 9 depicts illustrative battery modules 115. The battery modules 115 may include at least one submodule. For example, the battery modules 115 may include at least one first (e.g., top) submodule 220 or at least one second (e.g., bottom) submodule 225. At least one cold plate 215 may be disposed between the top submodule 220 and the bottom submodule 225. For example, one cold plate 215 may be configured for heat exchange with one battery module 115. The cold plate 215 may be disposed within, or thermally coupled between, the top submodule 220 and the bottom submodule 225. One cold plate 215 may also be thermally coupled with more than one battery module 115 (or more than two submodules 220, 225). The battery submodules 220, 225 may collectively form one battery module 115. In some embodiments, each submodule 220, 225 may be considered as a complete battery module 115, rather than a submodule.

The battery modules 115 may each include a plurality of battery cells 120. The battery modules 115 may be disposed within the housing 205 of the battery pack 110. The battery modules 115 may include battery cells 120 that are cylindrical cells, prismatic cells, or other form factor cells. The battery module 115 may operate as a modular unit of battery cells 120. As an illustration, a battery module 115 may collect current or electrical power from the battery cells 120 that are included in the battery module 115 and may provide the current or electrical power as output from the battery pack 110. The battery pack 110 may include any number of battery modules 115. For example, the battery pack may have one, two, three, four, five, six, seven, eight, nine, ten, eleven, twelve or other number of battery modules 115 disposed in the housing 205. It should also be noted that each battery module 115 may include a top submodule 220 and a bottom submodule 225, possibly with a cold plate 215 between the top submodule 220 and the bottom submodule 225. The battery pack 110 may include, or define, a plurality of areas for positioning of the battery module 115. The battery modules 115 may be square, rectangular, circular, triangular, symmetrical, or asymmetrical. In some embodiments, battery modules 115 may be different shapes, such that some battery modules 115 are rectangular but other battery modules 115 are square shaped, among other possibilities. The battery module 115 may include or define a plurality of slots, holders, or containers for a plurality of battery cells 120.

Figure 10A:
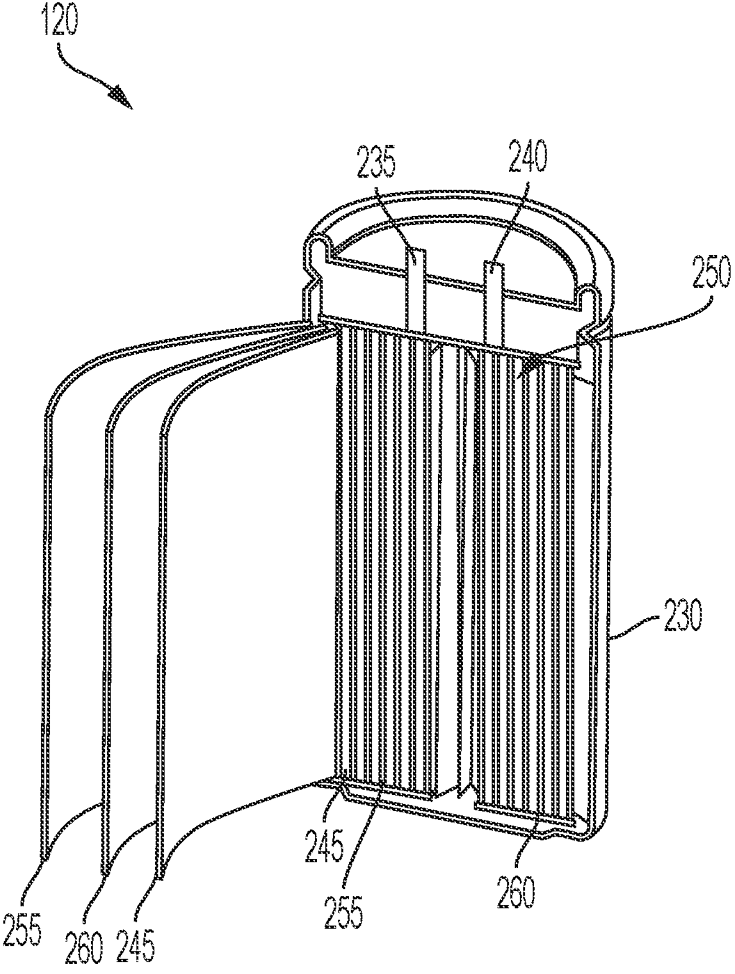
FIGS. 10A, 10B, and 10C are cross sectional illustrations of various batteries, according to various embodiments.
Figure 10B:
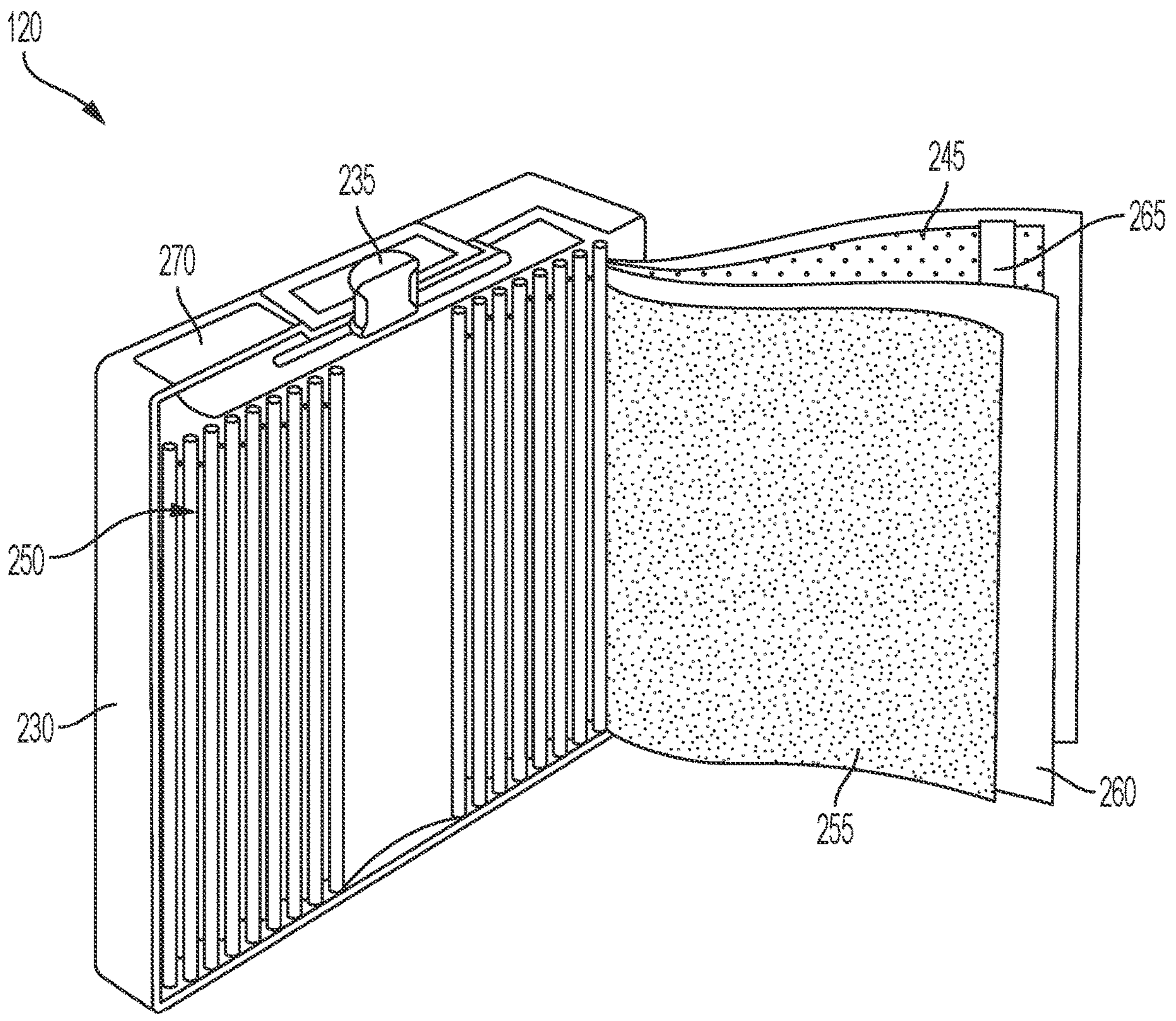
Figure 10C:
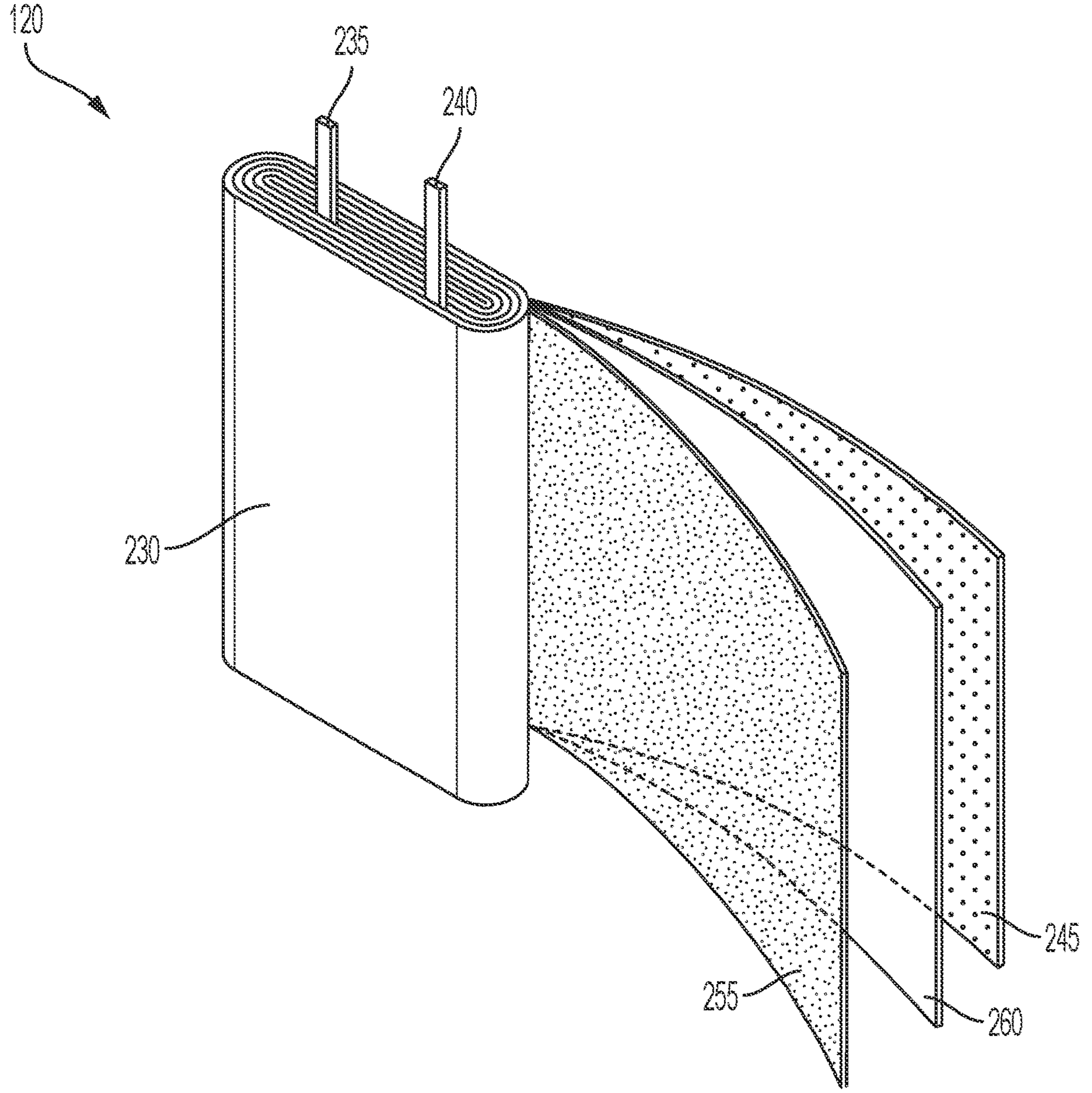

As noted above, battery cells 120 have a variety of form factors, shapes, or sizes. For example, battery cells 120 may have a cylindrical, rectangular, square, cubic, flat, or prismatic form factor. FIGS. 10A, 10B, and 10C depict illustrative cross sectional views of battery cells 120 in such various form factors. For example FIG. 10A is a cylindrical cell, 10B is a prismatic cell, and 10C is the cell for use in a pouch. The battery cells 120 may be assembled by inserting a wound or stacked electrode roll (e.g., a jellyroll) including electrolyte material into at least one battery cell housing 230. The electrolyte material, e.g., an ionically conductive fluid or other material, may generate or provide electric power for the battery cell 120. A first portion of the electrolyte material may have a first polarity, and a second portion of the electrolyte material may have a second polarity. The housing 230 may be of various shapes, including cylindrical or rectangular, for example. Electrical connections may be made between the electrolyte material and components of the battery cell 120. For example, electrical connections with at least some of the electrolyte material may be formed at two points or areas of the battery cell 120, for example to form a first polarity terminal 235 (e.g., a positive or anode terminal) and a second polarity terminal 240 (e.g., a negative or cathode terminal). The polarity terminals may be made from electrically conductive materials to carry electrical current from the battery cell 120 to an electrical load, such as a component or system of the electric vehicle 105.

The battery cell 120 may include at least one anode layer 245, which may be disposed within the cavity 250 defined by the housing 230. The anode layer 245 may receive electrical current into the battery cell 120 and output electrons during the operation of the battery cell 120 (e.g., charging or discharging of the battery cell 120). The anode layer 245 may include an active substance.

The battery cell 120 may include at least one cathode layer 255 (e.g., a composite cathode layer compound cathode layer, a compound cathode, a composite cathode, or a cathode). The cathode layer 255 may be disposed within the cavity 250. The cathode layer 255 may output electrical current out from the battery cell 120 and may receive electrons during the discharging of the battery cell 120. The cathode layer 255 may also release lithium ions during the discharging of the battery cell 120. Conversely, the cathode layer 255 may receive electrical current into the battery cell 120 and may output electrons during the charging of the battery cell 120. The cathode layer 255 may receive lithium ions during the charging of the battery cell 120.

The battery cell 120 may include at least one electrolyte layer 260 disposed within the cavity 250. The electrolyte layer 260 may be arranged between the anode layer 245 and the cathode layer 255 to separate the anode layer 245 and the cathode layer 255. The electrolyte layer 260 may transfer ions between the anode layer 245 and the cathode layer 255. The electrolyte layer 260 may transfer cations from the anode layer 245 to the cathode layer 255 during the operation of the battery cell 120. The electrolyte layer 260 may transfer cations (e.g., lithium ions) from the cathode layer 255 to the anode layer 245 during the operation of the battery cell 120. A liquid electrolyte may be present to facilitate the $Li^+$ ion transport between two electrodes. In the case of utilizing a solid or semi-solid electrolyte material, it may be placed between the anode layer 245 and cathode layer 255.

FIG. 10B is an illustration of a prismatic battery cell 120. The prismatic battery cell 120 may have a housing 230 that defines a rigid enclosure. The housing 230 may have a polygonal base, such as a triangle, square, rectangle, pentagon, among others. For example, the housing 230 of the prismatic battery cell 120 may define a rectangular box. The prismatic battery cell 120 may include at least one anode layer 245, at least one cathode layer 255, and at least one electrolyte layer 260 disposed within the housing 230. The prismatic battery cell 120 may include a plurality of anode layers 245, cathode layers 255, and electrolyte layers 260. For example, the layers 245, 255, 260 may be stacked or in a form of a flattened spiral. The prismatic battery cell 120 may include an anode tab 265. The anode tab 265 may contact the anode layer 245 and facilitate energy transfer between the prismatic battery cell 120 and an external component. For example, the anode tab 265 may exit the housing 230 or electrically couple with a positive terminal 235 to transfer energy between the prismatic battery cell 120 and an external component.

The battery cell 120 may also include a pressure vent 270. The pressure vent 270 may be disposed in the housing 230. The pressure vent 270 may provide pressure relief to the battery cell 120 as pressure increases within the battery cell 120. For example, gases may build up within the housing 230 of the battery cell 120. The pressure vent 270 may provide a path for the gases to exit the housing 230 when the pressure within the battery cell 120 reaches a threshold.

The present invention, thus generally described, will be understood more readily by reference to the following examples, which are provided by way of illustration and are not intended to be limiting of the present invention.

EXAMPLES

General. First-principles density functional theory (DFT)-based methodologies can be used to determine, understand, and pre-select materials exhibiting the desired properties to modify the olivine-structured materials described herein. The DFT algorithms are used calculate the thermodynamic stability of the materials, to identify those material shaving stable ground state structures vs. high-energy structures. The DFT algorithms may be used to also determine the electrochemical properties such as average voltage ($\bar{V}$) between $x=x_1$ and $x_2$ in $LiM^2_xMn_yFe_{1-x-y}PO_4$ materials by using the Gibbs free energy ($\Delta G$) obtained from the internal DFT energy (E) calculations according to the following equation:

$$\overline{V} = -\frac{\Delta G}{(x_2 - x_1)ne} \approx -\frac{E_{Li_{x_2}MX} - E_{Li_{x_1}MX} - nE_{Li}}{(x_2 - x_3)ne}$$

Using DFT, various candidate materials were identified. Table 1 is a listing of potential candidates for doped materials.

TABLE 1

List of elements being considered as doping element M in $LiM^2_xMn_yFe_{1-x-y}PO_4$.

| Z | Element | Oxidation State | Ionic radius [pm] | $r_{cat}/r_O$ | Structure | +/−10% tolerance |
|---|---|---|---|---|---|---|
| 8 | O | −2 | 126 | N/A | N/A | N/A |
| 12 | Mg | 2 | 86 | 0.683 | Oct | — |
| 13 | Al | 3 | 67.5 | 0.536 | Oct | — |
| 20 | Ca | 2 | 114 | 0.905 | Cubic | Cubic |
| 21 | Sc | 3 | 88.5 | 0.702 | Oct | — |
| 22 | Ti | 2 | 100 | 0.794 | Cubic | Oct |
| 22 | Ti | 3 | 81 | 0.643 | Oct | — |
| 23 | V | 2 | 93 | 0.738 | Cubic | Oct |
| 23 | V | 3 | 78 | 0.619 | Oct | — |
| 23 | V | 4 | 72 | 0.571 | Oct | — |
| 24 | Cr | 2 | 87 | 0.690 | Oct | — |
| 24 | Cr | 3 | 75.5 | 0.599 | Oct | — |
| 25 | Mn | 2 | 97 | 0.770 | Cubic | Oct |
| 25 | Mn | 3 | 78.5 | 0.623 | Oct | — |
| 26 | Fe | 2 | 92 | 0.730 | Oct | — |

TABLE 1-continued

List of elements being considered as doping element M in $LiM^2_xMn_yFe_{1-x-y}PO_4$.

| Z | Element | Oxidation State | Ionic radius [pm] | $r_{cat}/r_O$ | Structure | +/−10% tolerance |
|---|---|---|---|---|---|---|
| 26 | Fe | 3 | 78.5 | 0.623 | Oct | — |
| 27 | Co | 2 | 88.5 | 0.702 | Oct | — |
| 27 | Co | 3 | 75 | 0.595 | Oct | — |
| 28 | Ni | 2 | 83 | 0.659 | Oct | — |
| 28 | Ni | 3 | 70 | 0.556 | Cubic | Oct |
| 30 | Zn | 2 | 88 | 0.698 | Oct | — |
| 31 | Ga | 3 | 76 | 0.603 | Oct | — |
| 39 | Y | 3 | 104 | 0.825 | Oct | Cubic |
| 40 | Zr | 4 | 86 | 0.683 | Oct | — |
| 41 | Nb | 3 | 86 | 0.683 | Oct | — |
| 41 | Nb | 4 | 82 | 0.651 | Oct | — |
| 42 | Mo | 3 | 83 | 0.659 | Oct | — |
| 42 | Mo | 4 | 79 | 0.627 | Oct | — |
| 49 | In | 3 | 94 | 0.746 | Cubic | Oct |
| 50 | Sn | 4 | 83 | 0.659 | Oct | — |
| 57 | La | 3 | 117.2 | 0.930 | Cubic | Cubic |
| 58 | Ce | 3 | 115 | 0.913 | Cubic | Cubic |
| 72 | Hf | 4 | 85 | 0.675 | Oct | — |
| 74 | W | 4 | 80 | 0.635 | Oct | — |
| 83 | Bi | 3 | 117 | 0.929 | Cubic | Cubic |

Table 1 includes elements being considered as a dopant for $LiM^2_xMn_yFe_{1-x-y}PO_4$. Table 1 also provides information regarding the metal oxidation state and crystal ionic radii in pm (picometers). Based on the cation-anion radius ratio (i.e., $r_{cat}/r_O$), the allowed size cation was determined for a given structure. When $r_{cat}/r_O$ is from 0.414 and 0.732, the coordination number is 6 (i.e., $MO_6$). If $r_{cat}/r_O$ is from 0.732 to 1.000, the coordination number is then 8. In the case of both $LiFePO_4$ and $LiMnPO_4$, the oxidation state of the transition metals is $2^+$. The coordination numbers of Fe—O and Mn—O in $LiFePO_4$ and $LiMnPO_4$ are 6 (i.e., $FeO_6$ and $MnO_6$). Table 1 shows that $r_{Mn2+}/r_O$ is 0.770, indicating a corresponding coordination number of 8 (i.e., cubic), which is not the case for $LiMnPO_4$. Therefore, an estimated tolerance of +1-10% was used for the $r_{cat}/r_O$ values, to include $Ti^{2+}$, $V^{2+}$, and $In^{3+}$ for further analysis. It should be noted that the highest metal oxidation states are intentionally considered in Table 1 (e.g., $Ti^{4+}$, $Mn^{4+}$, etc.), due to the reducing nature of heat treatment conditions when preparing the Olivine-type cathode materials. Also, noble metals such as Pt, Pd, Au, Ag, etc. are not considered as a doping element for our study.

TABLE 2

List of thermodynamically stable M—P—O precursors including the doping element M for $LiM^2_xMn_yFe_{1-x-y}PO_4$ synthesis.

| M | Stable M—P—O precursors |
|---|---|
| $Mg^{2+}$ | $Mg(PO_3)_2$, $Mg_3(PO_4)_2$, $MgP_4O_{11}$, $Mg_2P_2O_7$ |
| $Al^{3+}$ | $AlPO_4$, $Al(PO_3)_3$ |
| $Sc^{3+}$ | $Sc(PO_3)_3$, $ScPO_4$ |
| $Ti^{2+}$, $Ti^{3+}$ | None (only $Ti^{4+}$-based Ti—P—O available) |
| $V^{2+}$, $V^{3+}$, $V^{4+}$ | $V_2PO_5$, $VPO_4$, $V(PO_3)_3$, $VP_2O_7$ |
| $Cr^{2+}$, $Cr^{3+}$ | $Cr_2P_2O_7$, $CrPO_4$, $Cr(PO_3)_3$ |
| $Co^{2+}$, $Co^{3+}$ | $Co_2P_2O_7$, $CoP_4O_{11}$, $Co(PO_3)_3$, $Co_3(PO_4)_2$, $CoPO_4$ |
| $Ni^{2+}$, $Ni^{3+}$ | $NiP_4O_{11}$, $Ni_3(PO_4)_2$, $Ni(PO_3)_3$, $Ni_2P_2O_7$ |
| $Zn^{2+}$ | $Zn_3(PO_4)_2$, $ZnP_4O_{11}$, $Zn(PO_3)_2$, $Zn_2P_2O_7$ |
| $Ga^{3+}$ | $GaPO_4$, $Ga(PO_3)_3$ |
| $Zr^{4+}$ | $Zr(PO_3)_4$, $ZrP_2O_7$, $Zr_2P_2O_9$ |
| $Nb^{3+}$, $Nb^{4+}$ | None (only $Nb^{5+}$-based Nb—P—O available) |
| $Mo^{3+}$, $Mo^{4+}$ | $MoP_2O_7$, $MO_4P_7O_{24}$, $Mo(PO_3)_3$ |
| $In^{3+}$ | $InPO_4$, $In(PO_3)_3$ |
| $Sn^{4+}$ | $SnP_2O_7$ |
| $Hf^{4+}$ | $Hf_2P_2O_9$, $HfP_2O_7$ |
| $W^{4+}$ | $WP_2O_7$ |

Table 2 summarizes a list of thermodynamically stable M-P—O compounds, as determined by the DFT algorithm. For the solution-based $LiM^2_xMn_yFe_{1-x-y}PO_4$ synthesis, it is likely that the metal containing precursors including, but not limited to, pure metal powders, oxides ($MO_x$), nitrates ($M(NO_3)_x$), chlorides ($MCl_x$), sulfates ($M(SO_4)_x$) may react with $PO_4^{3-}$ sources such as, but not limited to, $H_3PO_4$, $(NH_4)_2HPO_4$, and $NH_4H_2PO_4$ to form a new M-P—O intermediate precursors. From Table 2, each M-P—O precursor may be evaluated against the carbon source vs. $FePO_4$ and $MnPO_4$ precursors. Illustrative M-P—O compounds evaluated included $Mg(PO_3)_2$, $Mg_3(PO_4)_2$, $MgP_4O_{11}$, $Mg_2P_2O_7$, $AlPO_4$, $Al(PO_3)_3$, $Sc(PO_3)_3$, $ScPO_4$, $V_2PO_4$, $VPO_4$, $V(PO_3)_3$, $VP_2O_7$, $Cr_2P_2O_7$, $CrPO_4$, $Cr(PO_3)_3$, $Co_2P_2O_7$, $CoP_4O_{11}$, $Co(PO_3)_3$, $Co_3(PO_4)_2$, $CoPO_4$, $NiP_4O_{11}$, $Ni_3(PO_4)_2$, $Ni(PO_3)_3$, $Ni_2P_2O_7$, $Zn_3(PO_4)_2$, $ZnP_4O_{11}$, $Zn(PO_3)_2$, $Zn_2P_2O_7$, $GaPO_4$, $Ga(PO_3)_3$, $Zr(PO_3)_4$, $ZrP_2O_7$, $Zr_2P_2O_9$, $MoP_2O_7$, $Mo_4P_7O_{24}$, $Mo(PO_3)_3$, $InPO_4$, $In(PO_3)_3$, $SnP_2O_7$, $Hf_2P_2O_9$, $HfP_2O_7$, and $WP_2O_7$.

TABLE 3

$M^2$—P—O reactions with carbon. Most of $M^2$—P—O compounds are found to be more stable against carbon sources.

| M—P—O | C reaction | $E_{rxn}$ (eV/atom) | Note |
|---|---|---|---|
| $FePO_4$ | $0.2\ C + 0.8\ FePO_4 \rightarrow 0.4\ Fe_2P_2O_7 + 0.2\ CO_2$ | −0.060 | Reference |
| $MnPO_4$ | $0.2\ C + 0.8\ MnPO_4 \rightarrow 0.2\ CO_2 + 0.4\ Mn_2P_2O_7$ | −0.140 | Reference |
| $Mg(PO_3)_2$ | Stable | N/A | Does not produce $CO_2$ |
| $MgP_4O_{11}$ | | | |
| $Mg_2P_2O_7$ | | | |
| $AlPO_4$ | | | |
| $Al(PO_3)_3$ | | | |
| $Sc(PO_3)_3$ | | | |
| $ScPO_4$ | | | |
| $V_2PO_5$ | | | |
| $VPO_4$ | | | |
| $V(PO_3)_3$ | | | |

TABLE 3-continued

M²—P—O reactions with carbon. Most of M²—P—O compounds are found to be more stable against carbon sources.

| M—P—O | C reaction | $E_{rxn}$ (eV/atom) | Note |
|---|---|---|---|
| $VP_2O_7$ | $0.2\ C + 0.8\ VP_2O_7 \rightarrow 0.2\ CO_2 + 0.4\ V(PO_3)_3 + 0.4\ VPO_4$ | −0.030 | Better than $FePO_4$ |
| $Cr_2P_2O_7$ | Stable | N/A | Does not produce $CO_2$ |
| $CrPO_4$ | | | |
| $Cr(PO_3)_3$ | | | |
| $Co_2P_2O_7$ | | | |
| $CoP_4O_{11}$ | | | |
| $Co(PO_3)_3$ | $0.2\ C + 0.8\ Co(PO_3)_3 \rightarrow 0.133\ Co_2P_2O_7 + 0.533\ CoP_4O_{11} + 0.2\ CO_2$ | −0.086 | Worse than $FePO_4$ |
| $CoPO_4$ | $0.2\ C + 0.8\ CoPO_4 \rightarrow 0.4\ Co_2P_2O_7 + 0.2\ CO_2$ | −0.181 | Worse than $MnPO_4$ |
| $NiP_4O_{11}$ | Stable | N/A | Does not produce $CO_2$ |
| $Ni_3(PO_4)_2$ | | | |
| $Ni(PO_3)_3$ | $0.2\ C + 0.8\ Ni(PO_3)_3 \rightarrow 0.533\ NiP_4O_{11} + 0.133\ Ni_2P_2O_7 + 0.2\ CO_2$ | −0.096 | Worse than $FePO_4$ |
| $Ni_2P_2O_7$ | Stable | N/A | Does not produce $CO_2$ |
| $Zn_3(PO_4)_2$ | | | |
| $ZnP_4O_{11}$ | | | |
| $Zn(PO_3)_2$ | | | |
| $Zn_2P_2O_7$ | | | |
| $GaPO_4$ | | | |
| $Ga(PO_3)_3$ | | | |
| $Zr(PO_3)_4$ | | | |
| $ZrP_2O_7$ | | | |
| $Zr_2P_2O_9$ | | | |
| $MoP_2O_7$ | | | |
| $Mo_4P_7O_{24}$ | | | |
| $Mo(PO_3)_3$ | | | |
| $InPO_4$ | | | |
| $In(PO_3)_3$ | | | |
| $SnP_2O_7$ | | | |
| $Hf_2P_2O_9$ | | | |
| $HfP_2O_7$ | | | |
| $HfP_2O_7$ | | | |

Table 3 shows that the reference precursor materials such as $FePO_4$ ($Fe^{3+}$) and $MnPO_4$ ($Mn^{3+}$) tend to reduce their oxidation metal states to $Fe^{2+}$ and $Mn^{2+}$ by forming $Fe_2P_2O_7$ and $Mn_2P_2O_7$, respectively, when reacting with carbon sources. The use of carbon sources and heat treatment together to reduce the transition metal to lower oxidation state is also known as a carbothermal reduction process. In the carbothermal reduction process, some of carbon sources pick up the oxygen atoms from the $MPO_4$ precursors to form $CO_2$ gas. In the case of $MnPO_4$, the reaction is found to be more favorable compared to $FePO_4$, where $E_{rxn,MnPO4}$ is −0.140 eV/atom and $E_{rxn,FePO4}$ is −0.060 eV/atom, respectively. As a result, as Mn contents increase in $LiMPO_4$ (M=Fe, Mn), more carbon sources may be needed to achieve the target weight percentage of carbon coating at the particle surfaces due to more severe $CO_2$ gas evolution in $MnPO_4$ vs. $FePO_4$. Similar $CO_2$ gas evolution trends are observed for $VP_2O_7$, $Co(PO_3)_3$, $CoPO_4$, and $Ni(PO_3)_3$. Except for $VP_2O_7$, the Erxn for $CO_2$ gas evolution for $Co(PO_3)_3$, $CoPO_4$, and $Ni(PO_3)_3$ are found to be more favorable than $FePO_4$ and/or $MnPO_4$.

Ionic conductivity is an important measure to determine how fast $Li^+$ ions can move in and out of a host electrode structure. FIG. 1 is a schematic illustration of an Olivine-type $LiMPO_4$ (M=Fe, Mn, etc.) cathode material. The $MO_6$ octahedral groups are representative of $FeO_6$ and $MnO_6$. In the Olivine-type cathode structure, the $Li^+$ ions enter and exit via (010) direction, i.e., 1D $Li^+$ channel, toward in/out of the page.

Figure 2:
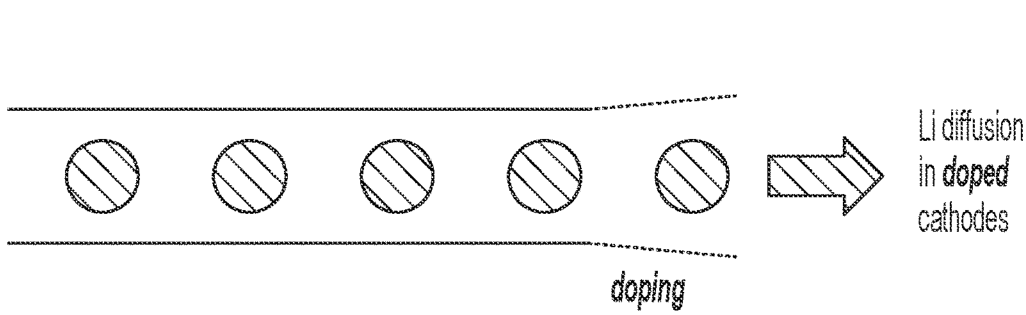
FIG. 2 is a schematic illustration describing $Li^+$ ion diffusion in Olivine-type cathode materials, according to the examples.

FIG. 2 is a schematic illustration describing $Li^+$ ion diffusion in Olivine-type cathode materials. In the pristine cathode materials, $Li^+$ ions travel through (010) direction, where $Li^+$ ions are surrounded by the $FeO_6$ and/or $MnO_6$ and $PO_4$ polyhedron units. When a new dopant is introduced at the metal site, the local atomic interaction between $Li^+$ ions, $FeO_6$, $MnO_6$, and $MO_6$ may be affected accordingly. At the same time, local structure distortion may significantly affect the $Li^+$ ion diffusion channel thickness, length, and/or shape.

Figure 3:
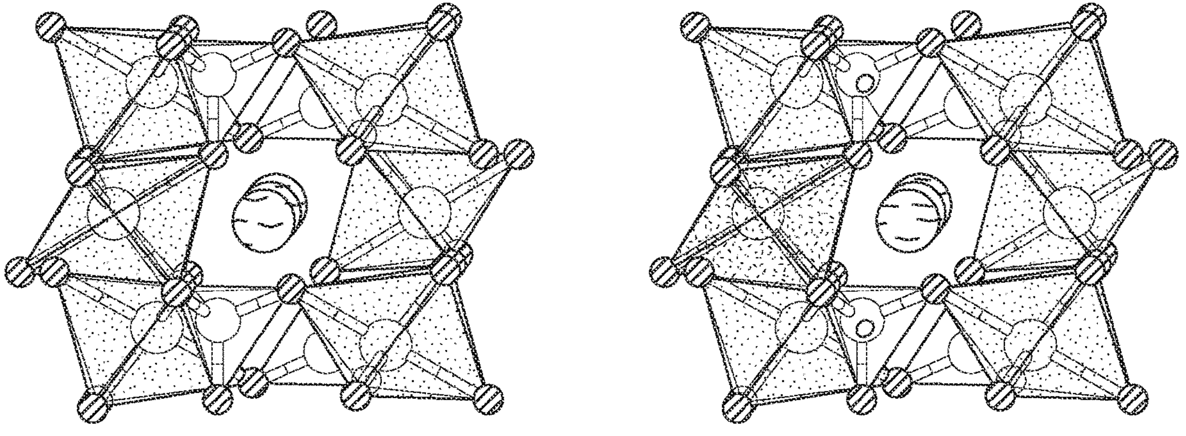
FIG. 3 is a comparison of the atomic structure of pristine and modified (doped) cathode materials, according to the examples.
Figure 4:
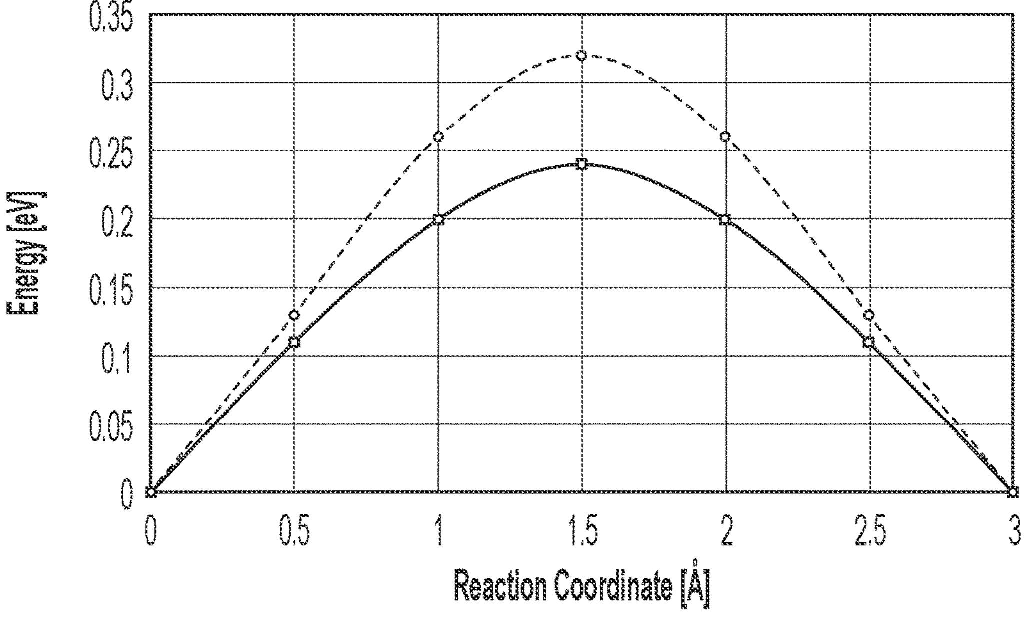
FIG. 4 is an illustration of the energy barrier of $Li^+$ ion diffusion between the pristine and doped Olivine cathode materials in (010) direction, according to the examples.

FIG. 3 is a comparison of the atomic structure of pristine and doped cathode materials. As demonstrated below, the local interaction between $MO_6$, $FeO_6$, $MnO_6$, $PO_4$, and $Li^+$ ions is affected due to an abrupt structural distortion in the (transition) metal sublattice. FIG. 4 is an illustration of the energy barrier of $Li^+$ ion diffusion between the pristine and doped Olivine cathode materials in (010) direction. The lower energy barrier is indicative of a more facile $Li^+$ ion diffusion.

List of dopants with its lowest oxidation state.

| Dopant | Ionic radius [pm] | Difference vs. $Mn^{2+}$ | Difference vs. $Fe^{2+}$ | Note |
|---|---|---|---|---|
| $Mg^{2+}$ | 86 | −11 | −6 | |
| $Al^{3+}$ | 67.5 | −30 | −25 | |
| $Sc^{3+}$ | 88.5 | −9 | −4 | |
| $V^{2+}$ | 93 | −4 | 1 | Similar size |
| $Cr^{3+}$ | 75.5 | −22 | −17 | |
| $Zn^{2+}$ | 88 | −9 | −4 | |
| $Ga^{3+}$ | 76 | −21 | −16 | |
| $Zr^{4+}$ | 86 | −11 | −6 | |
| $Mo^{3+}$ | 83 | −14 | −9 | |
| $In^{3+}$ | 94 | −3 | 2 | Similar size |

-continued

| Dopant | Ionic radius [pm] | Difference vs. $Mn^{2+}$ | Difference vs. $Fe^{2+}$ | Note |
|---|---|---|---|---|
| $Sn^{4+}$ | 83 | −14 | −9 | |
| $Hf^{4+}$ | 85 | −12 | −7 | |
| $W^{4+}$ | 80 | −17 | −12 | |

Table 4 is a summary illustrative doping elements that may be incorporated into $LiM^2_xMn_yFe_{1-x-y}PO_4$ cathode systems. In the case of $V^{2+}$ and $In^{3+}$, the size of ionic radius is very similar to $Fe^{2+}$ and $Mn^{2+}$. If the changes in the ionic radius are very large, then the corresponding modification in the diffusion channel is expected to be more significant. However, if the ionic radius and metal oxidation state is different, it is expected that the solubility limit would be less in the $Fe^{2+}$ and/or $Mn^{2+}$ site.

Here, the $LiM^2_xMn_yFe_{1-x-y}PO_4$; where, 0x<x≤0.1; 0≤y≤1; 0≤z≤1; x+y+z=1; M=Mg, Al, Sc, V, Cr, Zn, Ga, Zr, Mo, In, Sn, Hf, W, or a mixture of any two or more thereof. For example, two $M^2$ dopants (i.e. $M^I$ and $M^{II}$) may be used, as in Li-$M^I$-$M^{II}$-Mn—Fe—$PO_4$).

Table 5 shows several secondary Li-$M^2$-P—O phases when a dopant reaches its solubility limit within the $LiM^2_xMn_yFe_{1-x-y}PO_4$ cathode materials. For instance, when 5 mol % of Cr-containing precursors are added, only 3 mol % may sit at the metal site in the $LiM^2_xMn_yFe_{1-x-y}PO_4$. The remaining Cr is available to react with Li and/or $PO_4$ sources to form different species. If the $Li_3Cr_2(PO_4)_3$ from Table 5 is formed as a byproduct, it may have much higher ionic conductivity, when compared to a machine learning (ML)-computed conductivity value of $LiMPO_4$ (M=Fe, Mn).

TABLE 5

Li—M—P—O secondary phase with improved ionic conductivities

| Secondary stable phase | log(conductivity) |
|---|---|
| $Li_2VFe(P_2O_7)_2$ | −4.7684 |
| $Li_3V_2(PO_4)_3$ | −5.4064 |
| $LiV_2P_5O_{16}$ | −5.4064 |
| $Li_2InFe(P_2O_7)_2$ | −5.7588 |
| $Li_4MnV_3(P_2O_7)_4$ | −5.8538 |
| $LiVP_2O_7$ | −5.8649 |
| $Li_3Cr_2(PO_4)_3$ | −6.2099 |
| $LiV(PO_3)_4$ | −6.7347 |
| $LiMo_2(PO_4)_3$ | −7.0317 |
| $Li_8V_3P_8O_{29}$ | −7.1956 |
| $LiP_3(WO_6)_2$ | −7.3334 |
| $LiZr_2(PO_4)_3$ | −7.3778 |
| $Li_3Mo_3P_3O_{17}$ | −7.4254 |
| $LiCrP_2O_7$ | −7.4807 |
| $LiVPO_5$ | −7.5251 |
| $LiV_2(PO_4)_3$ | −7.7741 |
| $LiInP_2O_7$ | −7.9260 |
| $Li_{11}V_8(PO_4)_{12}$ | −7.9853 |
| $Li_2VCr(P_2O_7)_2$ | −8.4025 |
| $Li_9Cr_3P_8O_{29}$ | −8.4445 |
| $Li_3MnV(P_2O_7)_2$ | −8.8431 |
| $Li_6V_3P_8O_{29}$ | −8.9148 |
| $LiCr_4(PO_4)_3$ | −9.3432 |
| $Li_3Mo_2(PO_4)_3$ | −9.4331 |
| $LiMPO_4$ (M = Fe, Mn) | −10.2819 |

Figure 5:
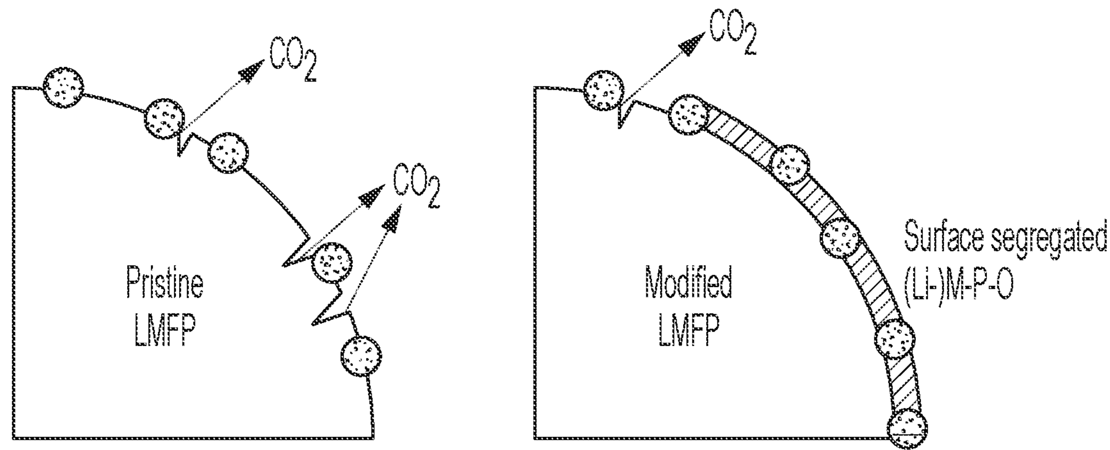
FIG. 5 is an illustration of the underlying mechanism of carbon coating on a modified $LiM_xMn_yFe_{1-x-y}PO_4$ cathode system, according to the examples.

Electrical conductivity is the movement of electrons ($e^-$), when a current (I) is being applied. Adding a conductive agent such as carbon black, CNT, graphene at the electrode fabrication steps or introducing a thin layer of carbon coating on the active cathode material can help increasing the electrical conductivity of a given battery system. In order to introduce a thin layer of carbon coating at the surface of active cathode materials, a hydro-carbon ($C_xH_yO_z$) compound such as sucrose, glucose, citric acid, acetylene black, citric acid, oxalic acid, L-Ascorbic acid, etc. is blended, mixed, or milled together with a given active material or precursor. When these C-containing precursors are heated, the carbon source remains at the particle surface of the active materials, while $H_yO_z$ evaporates in the form of $H_2O$, OH, etc. In some embodiments, the gaseous species may include, but is not limited to CO, $CO_2$, $O_2$, $NO_x$, $SO_x$, $Cl_2$, $H_2O$, or a mixture of any two or more thereof. The M-P—O precursor compound may interact carbon in such systems as illustrated in Table 3. It was observed that $MnPO_4$ reacts to form $CO_2$ gas more favorably, when compared with $FePO_4$. This means that a higher quantity of carbon sources may be needed in order to achieve the same weight percent of carbon coatings in the $LiMnPO_4$ vs. $LiFePO_4$. FIG. 5 illustrates the underlying mechanism of carbon coating on a modified $LiM^2_xMn_yFe_{1-x-y}PO_4$ cathode system. As noted above, several of the identified dopants may have limited solubility within the metal solubility in the $LiM^2_xMn_yFe_{1-x-y}PO_4$ cathode system, due to size differences in the crystal ionic radius. This means that excess amounts of M-P—O compounds may segregate toward the surface of active cathode materials. Forming a surface segregated Li-$M^2$-P—O material. See FIG. 5. As used herein a surface segregated Li-$M^2$-P—O has a higher concentration of the doped material toward the surface of the cathode active material. In some embodiments, if the interfacial energy between the host cathode and Li-$M^2$-P—O is smaller, Li-$M^2$-P—O may be present in the form of precipitates within the host cathode matrix. When segregated toward the surface, the precursor and Li-$M^2$-P—O materials may have reduced, or no, reaction tendency to form $CO_2$ gas when reacting with carbon. Therefore, it is expected that the modified $LiM^2_xMn_yFe_{1-x-y}PO_4$ will provide a more uniform carbon coating quality and quantity in the given synthesis reaction condition. See FIG. 5.

Figure 6:
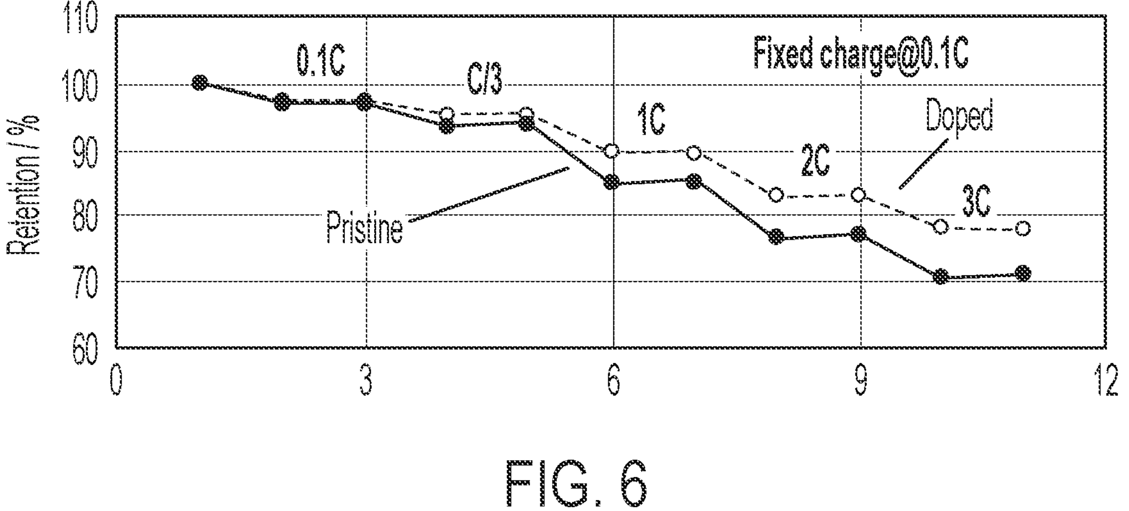
FIG. 6 is a graph of rate capabilities for pristine and doped cathode materials, according to the examples.

FIG. 6 is a graph of rate capability comparison between pristine and modified LMFP cathode materials, where an increased conductivity attributes to increase rate capabilities. The rate capabilities of electrodes are a good proxy to understand the increase in the electronic/ionic conductivities in a given cathode material system.

Experimental procedure. LMFP precursor materials will be mixed with another targeted metal dopants using solution-based approach with a mixing time varying from 5 min to 24 hours. Lithium sources include $Li_2CO_3$, $Li_3PO_4$, LiOH, $LiHCO_3$, or a mixture of any two or more thereof. The metal sources will be in forms of pure metal powder, oxides ($MO_x$), nitrates ($M(NO_3)_x$), chlorides ($MCl_x$), sulfates ($M(SO_4)_x$), etc. The $PO_4$ sources including but not limited to $H_3PO_4$, $(NH_4)_2HPO_4$, $NH_4H_2PO_4$ to form a new M-P—O intermediate precursor. The pH of the solution may be controlled by the presence of acid/base and/or oxidizing/reducing agents.

The mixture will then be dried and annealed at elevated temperature. For example, at or between any range of any two of the following values: 50, 75, 100, 125, 150, 200, 400, 500, 600, 700, 800, and 900° C. An aging time (the time from mixing to isolation of the MPO precursor) may be any of the following values or in a range of any two of the following values: 1, 2, 3, 4, 5, 10, 20, 30, 40, and 50 minutes; or, 1, 2, 3, 4, 8, 12, 16, or 24 hours. Changing the reaction time, precursor, temperatures, and the like will affect the mixing tendency between Fe, Mn, and a dopant in LMFP. Typically, reducing heat treatment conditions may be controlled by the presence of different gas agents including but not limited to $N_2$, $H_2$, CO, $CO_2$, or a mixture of any two or more thereof, as well as the source of carbon-containing hydrocarbon including but not limited to sucrose, glucose, citric acid, oleic acid, acetylene black, citric acid, oxalic acid, L-Ascorbic acid, or mixtures of any two or more thereof.

The resulting cathode materials have a surface BET area from about 10 to about 30 $m^2/g$. In another embodiment, a surface BET area may be greater than a 30 $m^2/g$, i.e., 30, 31, 32, 33, 34, 35, 36, 37, 38, 39, or 40 $m^2/g$. If the amount of the carbon coating wt % is increased, the surface BET area is also increased. An average primary particle size may be from about 50 nm to about 2 μm. This may include from about 50 nm to 1 μm, from about 50 nm, to 500 nm, from about 50 nm to about 250 nm, or from about 50 nm to about 150 nm. In some embodiments, primary particle size may be smaller: i.e. between 20 to 50 nm, depending on the process. A final carbon coating may be included from about 0.5 wt % to about 3.5 wt % of the cathode material weight.

Active materials containing modified, metal-doped, LMFP-based cathode will be mixed with conductive agents such as carbon/CNT and binder materials in an NMP (N-methylpyrrolidone) solution to form a slurry. The slurry may then be coated onto a carbon-coated Al foil, and then dried in the oven to remove the NMP. The loading level of cathode materials may be from about 10 to 40 $mg/cm^2$, and the packing density may vary from 1.5 to 4.0 g/cc.

Electrodes may be assembled as the cathode in Li-ion batteries, where the anode materials may include Li metal, graphite, Si, $SiO_x$, Si nanowire, lithiated Si, or a mixture of any two or more thereof. A traditional liquid electrolyte with a $LiPF_6$ salt, dissolved in a carbonate solution may be used. In one embodiment, an amount of sacrificial Li salt may be added to accommodate the Li loss for the SEI formation on the anode side.

In another embodiment, a solid-state electrolyte includes oxide, sulfide, or phosphate-based crystalline materials as replacement for liquid electrolytes. The cell configuration may be prismatic, cylindrical, or pouch type. Each cell can further be configured together to design pack, module, or stack with a desired power output.

While certain embodiments have been illustrated and described, it should be understood that changes and modifications can be made therein in accordance with ordinary skill in the art without departing from the technology in its broader aspects as defined in the following claims.

The embodiments, illustratively described herein may suitably be practiced in the absence of any element or elements, limitation or limitations, not specifically disclosed herein. Thus, for example, the terms "comprising," "including," "containing," etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the claimed technology. Additionally, the phrase "consisting essentially of" will be understood to include those elements specifically recited and those additional elements that do not materially affect the basic and novel characteristics of the claimed technology. The phrase "consisting of" excludes any element not specified.

The present disclosure is not to be limited in terms of the particular embodiments described in this application. Many modifications and variations can be made without departing from its spirit and scope, as will be apparent to those skilled in the art. Functionally equivalent methods and compositions within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, or compositions that can of course vary. It is also to be understood that the terminology used herein is for the purpose of describing particular embodiments only, and is not intended to be limiting.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like, include the number recited and refer to ranges which can be subsequently broken down into subranges as discussed above. Finally, as will be understood by one skilled in the art, a range includes each individual member.

All publications, patent applications, issued patents, and other documents referred to in this specification are herein incorporated by reference as if each individual publication, patent application, issued patent, or other document was specifically and individually indicated to be incorporated by reference in its entirety. Definitions that are contained in text incorporated by reference are excluded to the extent that they contradict definitions in this disclosure.

Other embodiments are set forth in the following claims.

What is claimed is:

1. An electrode active material comprising a dopant ($M^2$) and a lithium manganese iron phosphate host material represented as $LiM^2_xMn_yFe_{1-x-y}PO_4$, wherein the electrode active material exhibits an increased ionic conductivity compared to a lithium manganese iron phosphate ($LiMn_yFe_{1-y}PO_4$) without the dopant, wherein x is 0.01 to 0.15, and y is 0.30 to 0.85, wherein $M^2$ is $In^{3+}$.

2. The electrode active material of claim 1, wherein $M^2$ is present in the $LiM^2_xMn_yFe_{1-x-y}PO_4$ compound from about 1 mol % to about 15 mol %.

3. The electrode active material of claim 1, further comprising a carbon coating.

4. The electrode active material of claim 3, wherein the carbon coating comprises acetylene black, graphite, graphene, carbon nanotubes, or a mixture thereof.

5. A cathode active material comprising:

a host phase of formula $LiM^2_xMn_yFe_{1-x-y}PO_4$; and a secondary phase of formula $Li_aM^2_bP_cO_d$;

wherein:

x is 0.01 to 0.15;

y is 0.30 to 0.85;

a is 0 to 11;

b is 1 to 4;

c is 0 to 12;

d is 4 to 29;

$M^2$ is $In^{3+}$;

$M^2$ is present in the host phase at less than about 15 wt %; and the cathode active material exhibits an increased ionic conductivity compared to $LiMn_yFe_{1y}PO_4$ without the $M^2$ and the secondary phase.

6. The cathode active material of claim 5, wherein the secondary phase comprises $Li_2InFe(P_2O_7)_2$ or $LiInP_2O_7$.

7. The cathode active material of claim 5, wherein the secondary phase is present in the host phase from about 0.01 wt % to about 15 wt %.

8. The cathode active material of claim 5, further comprising a carbon coating.

9. The cathode active material of claim 5, wherein the cathode active material is a particulate material comprising a plurality of particles, wherein each particle of the plurality of particles has a concentration of the secondary phase that is greater at a surface of the particle than at a core portion of the particle.

10. An electrode active material comprising a dopant ($M^2$) and a lithium manganese iron phosphate host material represented as $LiM^2_xMn_yFe_{1-x-y}PO_4$, wherein the electrode active material exhibits an increased ionic conductivity compared to a lithium manganese iron phosphate ($LiMn_yFe_{1-y}PO_4$) without the dopant, wherein x is 0.01 to 0.15, and y is 0.30 to 0.85, wherein $M^2$ is $Ga^{3+}$, $In^{3+}$, or a mixture thereof; further comprising a secondary phase of formula $Li_aM^{2'}_bP_cO_d$, wherein a is 0 to 11;

b is 1 to 4;

c is 0 to 12;

d is 4 to 29; and $M^{2'}$ is $Ga^{3+}$, $In^{3+}$, or a mixture thereof.

11. The electrode active material of claim 10, wherein the secondary phase comprises $Li_2InFe(P_2O_7)_2$ or $LiInP_2O_7$.

12. The electrode active material of claim 10, wherein the secondary phase is present in the host phase from about 0.01 wt % to about 15 wt %.

13. The electrode active material of claim 10, wherein the electrode active material is a particulate material comprising a plurality of particles, wherein each particle of the plurality of particles has a concentration of the secondary phase that is greater at a surface of the particle than at a core portion of the particle.

14. The electrode active material of claim 10, further comprising a carbon coating.

15. The electrode active material of claim 11, wherein the carbon coating comprises acetylene black, graphite, graphene, carbon nanotubes, or a mixture thereof.

16. The electrode active material of claim 10, wherein $M^2$ is $In^{3+}$.

17. The electrode active material of claim 10, wherein $M^{2'}$ is $In^{3+}$.

18. The electrode active material of claim 10, wherein $M^2$ is $In^{3+}$ and $M^{2'}$ is $In^{3+}$.

* * * * *